United States Patent Office 2,923,705
Patented Feb. 2, 1960

2,923,705

PROCESSES AND METHODS FOR OBTAINING ANTIBIOTICS

Louis Chaiet, Newark, N.J., assignor to Merck & Co., Inc., Rahway, N.J., a corporation of New Jersey No Drawing. Application November 30, 1955
Serial No. 550,208

17 Claims. (Cl. 260—210)

This invention relates, generally, to processes and methods for obtaining the new and useful antibiotic, novobiocin, from its crude solutions; and, more particularly, it is concerned with certain improved processes and methods for recovering this antibiotic in substantially pure, crystalline state from solutions containing substances having cathomycin-activity, including fermentation broths, crude concentrates, dilute solutions, extracts, and the like.

Novobiocin is an antibiotic substance, possessing a broad antibacterial spectrum and being particularly active against gram-positive microorganisms, formed during aerobic cultivation, in a suitable aqueous nutrient medium and under controlled conditions, of the recently discovered microorganism *Streptomyces spheroides*. A viable culture of this novobiocin producing organism has been deposited in and added to the permanent culture collection of the United States Department of Agriculture Northern Regional Utilization Research Branch at Peoria, Illinois, identified as NRRL 2449. It will be understood that novobiocin may be produced, also, by mutants of this organism such as may be obtained by natural selection, or by use of a mutating agent such as ultraviolet or X-ray irradiation, nitrogen mustards, and the like.

This new antibiotic is comprised of the elements carbon, hydrogen, nitrogen, and oxygen, combined in a substance having approximately the empirical formula $C_{30-32}H_{34-40}N_2O_{10-12}$. It reacts as an acidic organic compound toward and is easily soluble in alkaline reagents, such as aqueous solutions of alkali-metal hydroxides, carbonates, and bicarbonates; it has two base-binding groups and can be precipitated from its solution in alkalis by acidification. It is soluble in the lower alkanols, lower aliphatic ketones, acetic acid and dioxane; it is insoluble or merely sparingly soluble in ether, benzene, ethyl acetate, chloroform, carbon tetrachloride, ethylene dichloride, water, and hydrochloric acid.

Substantially pure novobiocin has been obtained in two yellow crystalline modifications: a form crystallizing as rosettes and melting at about 152°–154° C., and another form having the appearance of flat needles, melting at about 170°–172° C. Each of these crystalline forms of the antibiotic can be converted into a normalized form, which may be an amorphous or submicrocrystalline form, by dissolving the crystals in acetone, quickly adding to this solution a relatively large volume of petroleum ether, and recovering the precipitated normalized material by filtration.

Alkaline aqueous solutions of novobiocin and mineral oil suspensions of the normalized form of the antibiotic exhibit characteristic absorption, the former in the ultraviolet and the latter in the infrared portions of the radiation spectrum. A solution of substantially pure novobiocin in 0.1 N aqueous sodium hydroxide exhibits a characteristic ultraviolet absorption peak at 3070 A. This absorption peak is indicative of a substantially pure material having a specific absorbency of 600, measured at this wavelength, using a solution containing one gram of pure novobiocin per hundred milliliters of the solution, contained in a cell having an absorption path of one centimeter. A solution of pure novobiocin in 0.1 N aqueous-methanolic hydrochloric acid exhibits a characteristic ultraviolet absorption peak at 3240 A.

$$E_{1\,cm.}^{1\%} 390$$

A mineral oil suspension of substantially pure normalized novobiocin exhibits characteristic infrared absorption peaks at the following wavelengths, expressed in microns; 5.8–6.0 (broad), 6.10, 6.21, 6.30, 6.49, 6.63, 7.4–7.6 (broad shoulder), 7.78, 7.96, 8.27 (weak), 8.60 (shoulder), 8.7 (shoulder), 9.13, 9.40, 10.0–10.1 (broad), 10.28, 10.60 (broad) 12.0–12.30 (broad), 12.60–12.75 (broad), 13.07, and 13.39.

Substantially pure crystalline novobiocin has a microbiological activity of about 4000 units to 5000 units per milligram, as determined by standard cup-plate diffusion methods, using *Bacillus megatherium* ATCC 9885 as the test organism. It is optically active, $[\alpha]_D^{25} = -27°$ (c., 1 in 1 N sodium hydroxide) and $[\alpha]_D^{25} = -44°$ (c., 1 in pyridine).

Novobiocin is active in inhibiting growth of gram-positive microorganisms primarily, although it also exhibits some activity against gram-negative microorganisms. It inhibits growth of the following organisms, inter alia:

M. pyogenes var. albus
M. pyogenes var. aureus
Diplococcus pneumoniae
Corynebacterium diphtheride type gravis
Corynebacterium diphtheriae type intermedius
Corynebacterium diphtheriae type mitis
Corynebacterium xerose
Corynebacterium renale
Neisseria meningitidis
Sarcina lutea (VD)
M. pyogenes var. aureus resistant to aureomycin
M. pyogenes var. aureus resistant to streptomycin-streptothricin
M. pyogenes var. aureus resistant to penicillin Aqueous media that are suitable for aerobic cultivation of strains of *Streptomyces spheroides* to produce novobiocin are, generally stated, those suitable for the production of other antibiotics by cultivation of other Streptomyces organisms. Such media contain sources of assimilable carbon, such as a carbohydrate; of assimilable nitrogen, such as corn steep liquor, casein hydrolysate, distiller's solubles, or the like; and inorganic salts, including trace metals, required for proper metabolism of the microorganism. Preferably, the medium is maintained at a temperature of 24°–28° C. during the period, usually about one to seven days, which the microorganism is cultivated, and aeration is provided for optimum growth of the organism and production of novobiocin. Fermented broths produced in this manner have an activity of about 150–2000 units per milliliter, and the fermentation broth solids have an activity of the order of about 2–25 units per milligram of solids. The antibioactive material can be purified and recovered in purer form by any of several procedures.

One such procedure is substantially as follows: The whole fermentation broth is filtered after adjusting the hydrogen ion concentration to pH 9.0, and to the filtrate, a diatomaceous earth filter aid is added, then the mixture is slowly acidified by addition of mineral acid until the hydrogen ion concentration is pH 2.0. After filtration, the cake is washed with water, extracted at pH 9.0 with aqueous methanol (85%), and the extract is concentrated by evaporation of the methanol. The hydrogen ion concentration of the aqueous solution is adjusted to about pH 9.0, then it is extracted with n-butanol.

The butanol extract is concentrated to a tenth of its original volume, added to fifteen times its volume of water at pH 9.0, a filter aid is added and the pH is slowly adjusted to 2.0 by addition of acid. The mixture is filtered, the residual cake is dried in vacuo, then it is milled and triturated with petroleum ether until no further colored material dissolves. The mixture is filtered, the cake is extracted with ethanol, and this solution of the bioactive material is subjected to chromatographic purification on an acid-washed alumina column. Impurities present in the ethanol extract are removed by adsorption on the alumina. Residual active material is removed from the column by washing with ethanol, the combined washings and effluent is concentrated to about 5% solids, diluted with slightly more than an equal volume of water and the antibiotic is allowed to crystallize. The product thus obtained has an activity of 2500 to 3000 units per milligram. By forming an acetone solution of this product, treating it with activated charcoal, removing the charcoal, slowly adding petroleum ether to turbidity, and allowing the mixture to stand overnight at ordinary room temperatures, with agitation, a crystalline product is obtained having an activity of 4500–5000 units per milligram.

It will be evident that this process for obtaining crystalline novobiocin comprises many steps, including repeated extractions by various preferential solvents, concentration of solutions and the handling of progressively more potent forms of the active material; the process, thus, has the disadvantage of being time consuming, requiring a large amount of skilled labor and attention from scientifically trained personnel. Moreover, this process has the disadvantage of requiring a relatively concentrated solution, purified by chromatography in combination with the preceding steps, as the starting material in the final step yielding the crystalline product. Unless this starting material has a novobiocin content of about 300 novobiocin units per milligram of solids, no acceptable crystalline product is obtainable.

One of the objects of this invention is to provide methods and processes for obtaining crystalline novobiocin in a state of high purity and biological activity that, by comparison to the process above described, are more direct, require less handling of the active material, and that require a much briefer period of time to complete processing of a batch of material to the final pure crystalline product.

Another of the objects of this invention is to provide a method for obtaining substantially pure crystalline novobiocin by direct treatment of concentrates containing the same, including crude concentrates from which no crystalline product could be obtained by the prior art methods above described.

Other objects of this invention will be apparent hereinafter during the description of specific features of the process.

According to certain broad aspects of this invention, pure crystalline novobiocin is recovered from a crude concentrated solution, which may be an alkaline aqueous or a lower alkanol solution, of novobiocin-active material by treating said solution with an alkanoic acid comprised of at most six carbon atoms and at least one carboxylic acid group per molecule, soluble in water and in aqueous lower alkanol solutions, and having a dissociation constant within the range of $10^{-3}$ to $10^{-6}$; in the presence of water and a monohydric alkanol, comprised of at most four carbon atoms per molecule, that is completely miscible with water in all proportions; and then recovering the desired product from the so-treated solution.

According to more limited aspects, the process or method of this invention comprises treating a crude aqueous concentrated solution of novobiocin-active material containing a monohydric alkanol that is completely miscible with water in all proportions and that is comprised of at most four carbon atoms per molecule, with an alkanoic acid comprised of at most six carbon atoms and at least one carboxylic acid group per molecule, soluble in water and in aqueous lower alkanol solutions, and having a dissociation constant within the range of $10^{-3}$ to $10^{-6}$; and recovering the desired substantially pure crystalline novobiocin from the so-treated solution. According to these aspects of the invention, the alkanol either may be added to the crude solution, if the solution is an alkaline aqueous concentrate, when the solution is treated with the alkanoic acid; or the alkanol may serve as the solvent vehicle of the crude solution, in which instance water is added to the alkanol solution when it is treated with the alkanoic acid.

According to other aspects of the process or method of this invention, substantially pure novobiocin is crystallized from a crude, concentrated, acidic, aqueous solution of novobiocin-active material containing (1) a monohydric alkanol comprised of at most four carbon atoms per molecule that is completely miscible with water in all proportions, and (2) an alkanoic acid comprised of at most six carbon atoms and at least one carboxylic acid group per molecule, soluble in water and in aqueous lower alkanol solutions, and having a dissociation constant within the range of $10^{-3}$ to $10^{-6}$. Even more specifically, it is preferred that the components of the solution from which the crystalline product is obtained, the alkanol, water, and the alkanoic acid, be present in the approximate proportions by volume of 10:4:1.

Among the alkanoic acids that may be utilized in practicing the process according to this invention are the monocarboxylic acids: formic, acetic, propionic, butyric, isobutyric, valeric, and isovaleric acids; and the polycarboxylic acids: citric, malic, malonic, succinic, and pyrotartaric acids. Of these, acetic acid presently is preferred.

Among the alkanols that may be utilized in practicing the process according to this invention are methanol, ethanol, propanol, isopropanol, and tertiary butanol. Of these, methanol presently is preferred.

To assure a more complete understanding of the subject matter of this invention and of how the methods and processes in accordance therewith best may be practiced, certain presently preferred specific embodiments of the invention will now be described, it being clearly understood that these specific examples are provided by way of illustration, merely, and not by way of limitation upon the invention defined in the subjoined claims.

*Example 1*

A novobiocin-producing strain of *Streptomyces spheroides* (NRRL aqueous 2449) is cultivated by submerged aerobic fermentation in a suitable nutrient medium for a period and under conditions such that the desired production of novobiocin in the fermentation broth occurs. A filtering aid, such as diatomaceous earth or the like, is added to the whole broth, at the hydrogen-ion concentration of harvest, usually about pH 7.0–8.0, then it is filtered and the cake is washed with warm water. The volume of the combined filtrate and washings is about one-fifth larger than that of the broth before filtration.

The broth is extracted in a suitable countercurrent extraction apparatus, with a volume of amyl acetate equal to a tenth of the volume of the filtered broth; the extraction is repeated with another like volume of amyl acetate; and the extracts are combined. It is important that the hydrogen-ion concentration of the aqueous phase, during this extraction operation, be adjusted to about pH 6.5 by addition of a suitable mineral acid, such as sulfuric acid.

The next step in the process utilizes an aqueous extracting solvent, referred to herein, for convenience merely, as an alkaline buffer solution, which may be prepared as follows: about 10 grams of sodium carbonate and 8 grams of sodium bicarbonate are dissolved in 950 milliliters of water, and 50 milliliters of methanol is added to make a total volume of one liter of solution. The combined amyl acetate extracts, in a suitable countercurrent extraction apparatus, are extracted with this alkaline buffer solution, using the latter in the proportion of one-fifth the volume of the former, and the extraction is repeated once with a like volume of aqueous extracting solvent. It is very important that the hydrogen-ion concentration of the aqueous phase, during this extraction operation, be maintained at or near pH 10, but no lower than pH 9.5, more alkali being added for this purpose, if required.

The aqueous buffer extracts obtained in this manner are combined and concentrated by evaporation, which serves also to remove dissolved amyl acetate, and a mineral acid, such as hydrochloric acid, is added until the hydrogen-ion concentration reaches pH 2.3–2.6. This causes decomposition of the sodium salt of novobiocin in the solution and precipitation of novobiocin, and this precipitate is recovered by filtration.

The filtration residue is weighed and dissolved in sufficient methanol to provide a solution containing about 10% by weight of solid, then sufficient water and acetic acid are added that, in the final solution, the proportions by volume of methanol, water, and acetic acid are 10:4:1. Pure, crystalline novobiocin separates from the solution and is recovered by filtration; the crystals are washed with a mixture of ten parts by a volume of methanol and four parts by volume of water, then dried under vacuum at temperatures below about 45° C.

*Example 2*

A novobiocin-producing strain of *Streptomyces spheroides* (NRRL 2449) is cultivated by submerged aerobic fermentation of a suitable aqueous nutrient medium for a period and under conditions such that the desired production of novobiocin in the fermentation broth occurs. A filtering aid such as diotomaceous earth or the like is added to the whole broth, then it is filtered at the hydrogen-ion concentration of harvest, usually about pH 7.0–8.0, and the cake is washed with warm water. The volume of the combined filtrate and washings is about one-fifth larger than that of the broth before filtration.

The hydrogen-ion concentration of the filtered broth is adjusted to pH 6.5 by addition of a suitable mineral acid, such as sulfuric acid, and the broth is extracted with a volume of amyl acetate equal to a tenth of the volume of the filtered broth. The extraction is repeated with another like volume of amyl acetate, and the extracts are combined.

The next step in the process utilizes an aqueous extracting solvent, namely, an alkaline buffer solution comprising aqueous ammonium hydroxide solution containing about 5% by volume of methanol. The combined amyl acetate extracts are extracted with this buffer methanol solution, using the latter in the proportion of one-fifth the volume of the former, and the extraction is repeated once with a like volume of aqueous extracting solvent.

The concentration of ammonium hydroxide in the buffer solution is so adjusted that, after extraction of the amyl acetate solution, the hydrogen-ion concentration of the aqueous extract is not lower than about pH 9.5.

The combined aqueous ammoniacal methanolic extracts are extracted with amyl acetate in a two-stage operation, using a volume of amyl acetate in each stage approximately equal to one-tenth the volume of the aqueous solution being extracted, and at a controlled hydrogen-ion concentration of pH 6.5. The amyl acetate extracts obtained in this manner are combined and, in turn, subjected to a two-stage extraction, using aqueous ammonium hydroxide solution containing 30% by volume of methanol and controlling the hydrogen-ion concentration during the extraction whereby it is maintained at pH 9.5. The volume of aqueous extracting solvent used in each stage of this extraction operation is approximately equal to one-fifth the volume of the combined amyl acetate extracts. These aqueous extracts contain about fifty milligrams of novobiocin per milliliter.

Methanol and acetic acid are added to the combined aqueous extracts to produce a mixture containing methanol, water, and acetic acid in the proportions by volume of 10:4:1, whereby pure crystalline novobiocin separates as a precipitate and is recovered. This product is identical with that obtained as described in the preceding example.

*Example 3*

A novobiocin-producing strain of *Streptomyces spheroides* is cultivated in a suitable nutrient medium as described in the preceding examples, then the hydrogen-ion concentration of the whole broth is adjusted to pH 9.0, the broth is filtered, to the filtrate a diatomaceous earth filter aid is added, the mixture is slowly acidified by addition of mineral acid until the hydrogen ion concentration is pH 2.0, and the mixture is filtered. After filtration, the cake is washed with water, extracted at pH 9.0 with aqueous methanol (85%), and the extract is concentrated by evaporation of the methanol. To the aqueous alkaline solution obtained in this manner is added a mineral acid, such as hydrochloric acid, until the hydrogen-ion concentration reaches about pH 2.3–2.6. This causes decomposition of the alkaline salt of novobiocin and precipitation of novobiocin, which is recovered by filtration.

The filtration residue is weighed and dissolved in sufficient methanol to provide a solution containing about 10% by weight of solid, then sufficient water and acetic acid are added that, in the final solution, the proportions by volume of methanol, water, and acetic acid by volume are about 10:4:1. Crystalline novobiocin separates from the solution and is recovered by filtration; the crystals are washed with a mixture of ten parts by volume of methanol and four parts by volume of water, then dried under vacuum at temperatures below about 45° C.

*Example 4*

About 500 cubic centimeters of an amyl acetate solution of novobiocin, having an activity of 50,000 novobiocin units per cubic centimeter and containing 10 milligrams of novobiocin per cubic centimeter, is subjected to a two-stage extraction, using in each stage 50 cubic centimeters of aqueous ammonium hydroxide solution (1 N) containing 30% by volume of methanol. The separated aqueous extracts are combined and 94 cubic centimeters of methanol and 14 cubic centimeters of glacial acetic acid are added, with agitation during the addition. After about ten to fifteen minutes, pure crystalline novobiocin begins to separate from the solution and the crystallization is permitted to continue for a period of about twelve hours, the solution being agitated throughout this time. The crystals are recovered from the solution by filtration, washed with about 10 cubic centimeters of aqueous methanol (33:67% by volume), then with about 10 cubic centimeters of diethyl ether, and dried. About 4.5 grams of the crystalline product is obtained, assaying 5000 novobiocin units per milligram and, when dissolved in 0.1 N sodium hydroxide, having a characteristic ultraviolet absorption peak at 3070 A.

$$(E_{1cm}^{1\%}=588)$$

*Example 5*

About 124 grams of crude crystalline novobiocin obtained by precipitating the antibiotic from its acetone solution by addition thereto of petroleum ether, is dissolved in approximately 1350 milliliters of absolute ethanol and 1300 milliliters of this solution is treated with 500 milliliters of water and 13 milliliters of glacial acetic acid with agitation, then the mixture is permitted to stand overnight, the agitation being continued throughout this period. The crystaline product which separates is recovered by filtration, washed with 100 milliliters of aqueous ethanol (71% by volume), and dried under vacuum at 45° C. It is found to weigh 108 grams and to assay 4040 novobiocin units per milligram.

Example 6

About 50 milliliters of a concentrated acetone solution of novobiocin, assaying 2200 novobiocin units per milligram of solids and containing $10 \times 10^6$ novobiocin units total activity, is treated with 1 milliliter of water and 50 milliliters of petroleum ether. About 5 milliliters of an oil, containing about $2 \times 10^6$ novobiocin units of the active material, separates and is removed. Petroleum ether is added to the separated solvent layer until a slight turbidity appears as a haze in the formerly clear solution, then the mixture is allowed to stand and the separated crystals of crude novobiocin are recovered, washed and dried. This material is found to assay 2600 units per milligram and it weights about 0.55 gram. Approximately 0.5 gram of this crude product is dissolved in 5 milliliters of ethanol, then 2 milliliters of water and a drop of glacial acetic acid are added and the solution, with continuous agitation for a period of about 17 hours, is allowed to crystallize. The crystals are removed by filtration, washed and dried. The product so obtained, assaying 3680 novobiocin units per milligram, weighs about 0.45 gram.

Example 7

One liter of filtered fermentation broth, obtained as described in Example 1 and containing 1190 novobiocin units of active material per milliliter, as determined by bioassay, is subjected to a two-stage extraction at a hydrogen-ion concentration of about pH 6.5, using in each stage 100 milliliters of amyl acetate. The extracts are combined, then extracted in a two-stage operation, using 40 milliliters in each stage, with 80 milliliters of alkaline aqueous buffer solution, containing 5% by volume of methanol and prepared as described in Example 1. The combined aqueous extracts are concentrated to remove amyl acetate, then acidified by addition of aqueous hydrochloric acid to a hydrogen-ion concentration of pH 2.5, causing precipitation of crude novobiocin, which is recovered by filtration. The semi-wet cake of crude material is dissolved in 5 milliliters of methanol and 2 milliliters of water containing 0.5 milliliters of glacial acetic acid are added. The mixture is agitated for about 17 hours, then the pure crystalline novobiocin product which separates is removed, washed with equeous methanol (70% by volume) and dried. This product assays 4800 novobiocin units per milligram.

Example 8

One liter of an ethanol solution of novobiocin, having an activity of 1260 novobiocin units per milligram of solids, is mixed with two liters of water and hydrochloric acid is added until the hydrogen-ion concentration is about pH 2.0, causing separation of crude novobiocin which, after addition of 15 grams of diatomaceous earth filter aid, is recovered by filtration. The cake is slurried in aqueous ammonium hydroxide solution at a hydrogen-ion concentration of about pH 10, then it is filtered, yielding about 600 milliliters of filtrate. Approximately 400 milliliters of this filtrate is passed into a column containing 150 cubic centimeters of Amberlite XE 98 resin (chloride cycle), the resin is washed with methanol (85%), and the novobiocin is eluted with a solution comprising 85% by volume of methanol, 16% by volume of concentrated hydrochloric acid. The crude novobiocin in this eluate, assaying 3700 novobiocin units per milligram of solids, is precipitated by addition thereto of twice its volume of water. The precipitate is recovered by filtration, dissolved in ethanol, and chromatographed over 20 grams of acid-washed alumina. The effluent, having a volume of about 25 milliliters, is collected, 0.5 milliliter of glacial acetic acid is added, then water is added slowly. Crystals of pure novobiocin separate and are recovered by filtration.

Example 9

The procedure described in Example 7 is repeated with the sole modification that isopropanol is substituted for the methanol. The product obtained is identical with that obtained as described in Example 4.

Example 10

The procedure described in Example 3 is repeated with the sole modification that n-propanol is substituted for the methanol. The product obtained is identical with that obtained as described in Example 3.

Example 11

The procedure described in Example 7 is repeated with the sole modification that tertiary butanol is substituted for the methanol. The product obtained is identical with that obtained as described in Example 4.

Example 12

The procedure described in Example 3 is repeated with the sole modification that ethanol is substituted for the methanol. The product obtained is identical with that obtained as described in Example 3.

Example 13

The procedure described in Example 1 is repeated with the sole modification that the acetic acid used in the final step of crystallizing the pure product is replaced with a stoichiometrical equivalent of citric acid. The product so obtained is identical with that obtained as described in Example 1.

Example 14

The process described in Example 1 is modified, as in Example 13, by substituting propionic acid for the acetic acid, with like result.

Example 15

The process described in Example 1 is modified, as in Example 13, by substituting butyric acid for the acetic acid, with like result.

Example 16

The process described in Example 1 is modified, as in Example 13, by substituting formic acid for the acetic acid, with like result.

Example 17

The process described in Example 1 is modified, as in Example 13, by substituting isobutyric acid for the acetic acid, with like result.

What is claimed is:

1. Process for obtaining substantially pure crystalline novobiocin from a concentrated solution of novobiocin-active material that comprises treating said solution with an alkanoic acid comprised of at most six carbon atoms and at least one carboxylic acid group per molecule, soluble in water and in aqueous lower alkanol solutions, and having a dissociation constant within the range of $10^{-3}$ to $10^{-6}$; in the presence of water and a monohydric alkanol, comprised of at most four carbon atoms per molecule, that is completely miscible with water in all proportions, said alkanol, water, and alkanoic acid being in the mixture in the approximate proportions by volume of 10:4:1; and recovering the desired substantially pure crystalline novobiocin from the so-treated solution.

2. Process as defined in claim 1 wherein the alkanol is methanol.

3. Process as defined in claim 1 wherein the alkanol is ethanol.

4. Process as defined in claim 1 wherein the alkanol is propanol.

5. Process as defined in claim 1 wherein the alkanol is isopropanol.

6. Process as defined in claim 1 wherein the alkanol is tertiary butanol.

7. Process as defined in claim 1 wherein the alkanoic acid is formic acid.

8. Process as defined in claim 1 wherein the alkanoic acid is acetic acid.

9. Process as defined in claim 1 wherein the alkanoic acid is propionic acid.

10. Process as defined in claim 1 wherein the alkanoic acid is butyric acid.

11. Process as defined in claim 1 wherein the alkanoic acid is isobutyric acid.

12. Process as defined in claim 1 wherein the alkanoic acid is citric acid.

13. Process for obtaining substantially pure crystalline novobiocin from a crude aqueous concentrated solution of novobiocin-active material containing a monohydric alkanol, completely miscible with water in all proportions and comprised of at most four carbon atoms per molecule, that comprises treating said solution with an alkanoic acid comprised of at most six carbon atoms and at least one carboxylic acid group per molecule, soluble in water and in aqueous lower alkanol solutions, and having a dissociation constant within the range of $10^{-3}$ to $10^{-6}$, said alkanol, water and alkanoic acid being in the mixture in the approximate proportions by volume of 10:4:1; and recovering the desired substantially pure crystalline novobiocin from the so-treated solution.

14. Process as defined in claim 13 wherein the alkanol is methanol and the alkanoic acid is acetic acid.

15. Process as defined in claim 13 wherein the alkanol is ethanol and the alkanoic acid is acetic acid.

16. Process that comprises crystallizing substantially pure novobiocin from a crude concentrated acidic aqueous solution of novobiocin-active material containing (1) a monohydric alkanol comprised of at most four carbon atoms per molecule that is completely miscible with water in all proportions, and (2) an alkanoic acid comprised of at most six carbon atoms and at least one carboxylic acid group per molecule, soluble in water and aqueous lower alkanol solutions, and having a dissociation constnat within the range of $10^{-3}$ to $10^{-6}$, said alkanol, water, and alkanoic acid being in the mixture in the approximate proportions by volume of 10:4:1.

17. Process as defined in claim 16 wherein the alkanol is methanol, the alkanoic acid is acetic acid, and the components of the solution, methanol, water, and acetic acid are present in the approximate proportions by volume of 10:4:1.

References Cited in the file of this patent

UNITED STATES PATENTS 2,516,080    Sobin et al. _____ July 18, 1950

OTHER REFERENCES

Florey et al.: "Antibiotics," vol. 1, publ. by Oxford University Press (New York), pages 95 to 105.

Kies et al.: "J. of Biol. Chem.," April 1951, pages 637, 638, 643, 644 and 645.

Sokolski et al.: "Antibiotics and Chemotherapy," vol. 4, No. 10, October 1954, pages 1057 to 1060.